2,706,675

PRODUCTION OF HYDROGEN CYANIDE

John B. Chatelain, Freeport, Tex., assignor to Freeport Sulphur Company, New York, N. Y., a corporation of Delaware No Drawing. Application October 3, 1950, Serial No. 188,273

7 Claims. (Cl. 23—151)

This invention relates to the recovery of hydrogen cyanide as such or in the form of compounds thereof, from reaction gases containing hydrogen cyanide in admixture with ammonia or water vapor, or with ammonia and water vapor.

In the literature there are a number of processes describing the production of hydrogen cyanide from gaseous mixtures containing nitrogen, hydrogen and carbon either with or without the addition of oxygen or air and either in the presence or absence of a catalyst. Among these processes are those involving (1) the reaction of nitrogen and methane; (2) the reaction of ammonia with a volatile hydrocarbon; (3) the reaction of nitrogen, methane and oxygen; (4) the reaction of ammonia, a volatile hydrocarbon and oxygen; (5) the reaction of carbon monoxide and ammonia and (6) the reaction of an oxide of nitrogen and a volatile hydrocarbon. In all of these reactions the gaseous mixtures are heated to temperatures of from about 600° to 1250° C. in any one of a number of ways such as, for example, by an electrical discharge, or by preheating the reaction gases, or by passing the gases over heated contact material, or by supplying the heat directly from some outside source.

The foregoing reactions each produces hot effluent hydrogen cyanide reaction gases containing a nitrogenous compound or nitrogen itself, hydrogen, some unreacted hydrocarbon, and also either ammonia or water vapor (if ammonia or an oxygen containing gas is employed). For recovering the hydrogen cyanide in these processes, it has heretofore been suggested that the hot effluent gases be reacted with alkali to form cyanide salts, either directly or after cooling by contact of the gases with heat exchange surfaces, next scrubbing with dilute sulphuric acid to fix ammonia in the form of its sulphate and finally, recovering the hydrogen cyanide in an aqueous solution.

Experimentation with the foregoing processes has led to the discovery that a larger quantity of hydrogen cyanide is initially produced in the hot reaction gases than is ultimately recovered. This loss in potential yield has been determined as resulting from decomposition or polymerization of the cyanide, or both through (1) contact with hot surfaces, or (2) contact with cold water employed in cooling and absorbing the hydrogen cyanide gases, or (3) contact with either water or solutions of hydrogen cyanide condensed on the cold surfaces of conventional heat exchange equipment, or (4) becaue of polymerization in the water solutions which are not sufficiently acidic.

An ultimate object of the instant invention is to provide increased yields of hydrogen cyanide and maximum recovery of ammonia from hot effluent hydrogen cyanide gaseous products of any kind, as coke oven gases and especially those of the character hereinbefore described. Another object is to provide a process by which hydrogen cyanide reaction gases may be cooled to a temperature between 400° C. and about the temperature of the surrounding atmosphere, whereby optimum reaction conditions for the hydrogen cyanide are possible without at the same time causing or permitting the decomposition and loss of any appreciable amount of the hydrogen cyanide in the reaction gases to occur.

In one embodiment a specific object is to recover hydrogen cyanide as such instead of in the form of sodium cyanide or other converted form without sacrificing any of the initial yield of hydrogen cyanide in the hot effluent reaction gases. Other specific objects are to produce maximum possible yields of various hydrogen cyanide derivatives and to accomplish maximum recovery of ammonia from the effluent reaction gases when the same is present.

In its preferred specific embodiment, the invention involves rapidly cooling a hydrogen cyanide-containing hot gas mixture of the character hereinbefore defined to a temperature at least as low as 400° C. by directly contacting the gas mixture, substantially immediately upon its emergence from the reaction zone or production source, with a relatively cool or cold aqueous solution of a boric acid-polyhydroxy complex which is of acidic character and collecting the hydrogen cyanide either by dissolution in a stabilizing solution or by chemically reacting the same with a suitable reagent.

Contact between the quenching solution and the hot gas mixture may be brought about in any suitable way or by any desired apparatus, as for example, by scrubbing or by spraying the quenching solution into a stream of the gas or by both procedures.

By varying the quench solution volume or its temperature or both, several different results may be attained. Firstly, the gas mixture may be cooled to 400° C. or somewhat below such temperature whereupon the hydrogen cyanide is recovered by conventional means as by reacting the hot gas with alkali. Secondly, the gases may be cooled down to room temperature in contact with the quench solution whereby the hydrogen cyanide is dissolved therein and the ammonia (if present) is completely absorbed by reaction with the complex. Thirdly, the gaseous mixture may be cooled to an intermediate temperature with the result that the ammonia is selectively absorbed and after which the hydrogen cyanide gas is taken up in any desired manner.

In commercial operations, regardless of the variation of the process employed, a portion or all of the quenching solution is withdrawn from the quenching zone and if hot is cooled for example by contacting it with cooling surfaces as in a conventional heat exchanger and is then recycled for further quenching. If the hydrogen cyanide has been dissolved in the quenching solution it may be recovered by distillation. If both ammonia and hydrogen cyanide are present, they may be recovered separately and in substantially pure form by selectively stripping the solution in accordance with the procedure described in the copending application, Serial Number 83,132 now Patent No. 2,590,146.

Boric acid-polyhydroxy complexes of the nature contemplated by the present invention are described in many published articles. Of the earlier articles there may be mentioned:

1. J. Boeseken et al., Rec. trav. chim. 30, 392–406, Chem. Abstracts 6, 623. The conductivity (due to acidity) of boric acid is described as being increased by reaction with glycerol, pentaerythritol, pyrocatechol, and pyrogallol.

2. J. Boeseken et al., Rec. trav. chim. 34, 96–113, Chem. Abstracts 9, 1766. Conductivity increases are reported for reaction products with erythritol, mannitol, dulcitol, sorbitol, and $CNO_2(CH_2OH)_3$.

3. J. Boeseken, Rec. trav. chim. 40, 553–67, Chem. Abstracts 16, 906. Conductivity increases by a number of compounds are described and here it is stated that the mutual increase in the electrical conductivity by mixing polyalcohols, polyphenols, HO acids, ketonic acids, etc. with $H_3BO_3$ is due to the formation of complex acids stronger than the components.

The complexes preferred in the operation of the process of the instant invention are the boric acid-pentaerythritol complex and the boric acid-glycerol complex.

When ammonia is present in the gases treated and is to be absorbed in the stabilizing solution, such solution should be more strongly acidic in order that the minimum acidity required for effecting stabilization will be maintained until a satisfactorily large quantity of hydrogen cyanide has been taken up. Stabilization ordinarily will be effected up to the point where the pH value reaches about 6.8 as the absorption process progresses.

As stated, the present invention is applicable to hydrogen cyanide reaction gas mixtures resulting from any of the known processes hereinbefore enumerated and includes gases produced from hydrocarbons which may be straight chain or branched aliphatic hydrocarbons, either saturated or unsaturated (as lower alkanes or alkenes) or may be aromatic hydrocarbons (as benzene). These hydrocarbons may be contained in or derived from natural gas, coal gas, coke oven gas, oil-cracking plant gas, or other gases from destructive hydrogenation plants and may be converted by the action of any of the catalysts known to promote hydrogen cyanide syntheses such as for example, platinum, palladium, rhodium, osmium and iridium, either alone or in alloys.

Maximum yields from the hot effluent hydrogen cyanide gases are obtained only if this cooling procedure is employed in combination with the control step involving cooling the said reaction gases to the temperature below 400° C. in as short a time as is practical, or in less than a second and preferably in a period of one tenth of a second. That part of the decomposition of the hydrogen cyanide due alone to continuance of the high temperature conditions is thereby substantially avoided.

In order to emphasize the character of the present invention, it will be pointed out that although rapid cooling has been suggested as a desirable step in a procedure described in the literature, no satisfactory method of accomplishing the rapid cooling without causing some decomposition has been revealed therein. Conventional methods of accomplishing rapid cooling of various gases encountered in industrial processes involve the injection of cold water into the gases or involve contact with cold surfaces maintained at low temperatures of the usual efficient heat exchange equipment. The use of either of these methods for the treatment of the instant gases, however, leads to an appreciable reduction in the yields of hydrogen cyanide ultimately obtained due to decomposition resulting from the condensation of the hydrogen cyanide in the presence of impurities or the dissolution of all or a portion of the hydrogen cyanide in water solutions in which decomposition occurs. The exact reason for the decomposition obtained in these processes involving condensation in water, or upon surfaces wet with water, is not known, but it is believed to result from the reaction between the water in the liquid state and the hydrogen cyanide, or to the polymerization of the hydrogen cyanide in the presence of dissolved impurities.

In its broader scope, the instant invention involves the utilization of other acidic stabilizing solutions than those containing a boric acid-polyhydroxy complex. This broader invention may be considered as concerned with the prevention of the decomposition of hydrogen cyanide in hot effluent gases containing the same and to involve the quenching of such reaction gases to a temperature below 400° C. by contacting the same with an acidic stabilizing solution. This pH of the solution used need not be any lower than that known to stabilize hydrogen cyanide solution in conventional commercial solutions. Acid to methyl orange is a common test for determining adequate acidity of HCN stabilizing solutions. The quenching and stabilizing solution may be composed of an aqueous solution of sulphuric acid, acetic acid, phosphoric acid or any other strongly ionizable acid.

The quantity, and optionally also the temperature, of the quenching solution containing any of said acids must be adjusted to bring about the rapid cooling to below 400° C. or to room temperature.

In accordance with one alternative procedure, the reaction gases are cooled by the acidic solution to any desired temperature below 400° C. without absorbing the gases, and the hydrogen cyanide gases are recovered by conventional means, as by reacting the gases with an alkali or other reagent, etc. Any ammonia in the reaction gases is recoverable in the form of a salt of the acid used, for example, as ammonium sulphate in the case where sulphuric acid is used.

In accordance with another variation, the quenching solution containing the acid is used in a quantity and at a temperature sufficient to condense and collect the hydrogen cyanide therein. The hydrogen cyanide may then be recovered from the solution by distillation.

*Example I*

A reaction gas mixture containing 12.5% ammonia and 11.7% methane, the remainder being air, was passed through a series of activated platinum alloy screens mounted in a stainless steel reactor thereby producing hydrogen cyanide gas in admixture with other gases. This gaseous mixture leaving the reactor was introduced immediately into the bottom of a quenching tower into the top of which was sprayed an aqueous solution of a boric acid-polyhydroxy complex derived from approximately 2.5% of boric acid and 8.3% technical pentaerythritol, the solution introduced into the tower being at a temperature of approximately 25° C. Determinations of the gas volume and the hydrogen cyanide content of the effluent gas immediately after the same leaves the catalyst screens, and of the volume and hydrogen cyanide content of the quenching solution used, showed that no appreciable decomposition or loss of the hydrogen cyanide initially produced had occurred.

To show the advantage of the foregoing process, a test was run in which the quenching step was eliminated and instead the gases were cooled by natural radiation from the equipment to the surroundings. A sample of the effluent gases taken from a point two inches beyond the catalyst screen and another sample taken at a point where the gases had been cooled to approximately 400° C. by natural radiation were tested, and on analysis, it was revealed that decomposition of the hydrogen cyanide between the two points amounted to approximately 20%. In another test, plain cold water was used as a quenching medium and in this case decomposition was in excess of 30%. In yet another comparative test, the procedure of Example I was followed except that a conventional cooling coil was used instead of the quenching solution to cool the gas to 390° C. In this test approximately 25% of the hydrogen cyanide originally formed was decomposed.

*Example II*

The procedure of Example I was repeated with the addition of a step involving spraying an aqueous quench solution containing a complex of 2.5% boric acid and 10% glycerol into the reactant gases immediately after the same left the catalyst. The pregnant stabilizer solution was then introduced into an HCN stripper column wherein the solution was heated to a maximum of 90° C., the pressure being maintained at 20 inches Hg absolute. The hydrogen cyanide gas was collected from the top of the column and a solution containing the ammonia was withdrawn from the bottom of the column.

Thereupon the residual solution was introduced into a second column maintained at atmospheric pressure and the ammonia was stripped from the solution in conventional manner. The solution containing the boric acid-polyhydroxy complex or the constituents thereof was flowed from the bottom of the column and cooled for re-use in the process.

It should be understood that the invention is not limited to the details herein disclosed as to procedure, conditions of treatment, gas mixtures or reagents used but is to be interpreted in the light of the general disclosure and of the scope of the claims appended hereto.

I claim:

1. A method for recovering hydrogen cyanide in high yields from hot gas mixtures containing the same which comprises cooling the said hot gas mixtures rapidly from the temperature at which they are produced above 400° C. to a temperature below 400° C. by contacting the hot gas mixture with a relatively cool aqueous acidic solution of a polyhydroxy-boric acid complex, and collecting the cooled hydrogen cyanide thereby obtained before the same has been decomposed and lost.

2. A method for recovering hydrogen cyanide in high yields from hot gas mixtures containing the same which comprises cooling the said hot gas mixture rapidly from a temperature of 600°–1250° C. to a temperature at which the hydrogen cyanide gases become dissolved by contacting the hot gas mixture with a relatively cool aqueous acidic solution of a polyhydroxy-boric acid complex.

3. A method for recovering hydrogen cyanide in high yields from hot gas mixtures containing the same together with ammonia gases which comprises cooling the said hot gas mixtures rapidly from the temperature at which they are produced above 400° C. to a temperature at which the hydrogen cyanide gases become dissolved and said ammonia is taken up by reaction with a polyhydroxy-boric acid complex, by contacting the hot gas mixture with a relatively cool aqueous acidic solution of the polyhydroxy-boric acid complex, and separately recovering the hydrogen cyanide and the ammonia from the pregnant solution.

4. A method for recovering hydrogen cyanide in high yields from hot gas mixtures containing the same which comprises cooling the said hot gas mixture rapidly from the temperature at which they are produced above 400° C. to a temperature below 400° C. by spraying into the hot gas mixture a relatively cool aqueous acidic solution of a polyhydroxy-boric acid complex, whereby the hydrogen cyanide is obtained in cooled condition.

5. A method for recovering hydrogen cyanide in high yields from hot gas mixtures containing the same which comprises cooling the said hot gas mixture rapidly from a temperature of 600°–1250° C. to a temperature below 400° C. by scrubbing the gas mixture initially at said high temperature with a relatively cool aqueous acidic solution of a polyhydroxy-boric acid complex, whereby the hydrogen cyanide is obtained in cooled condition.

6. A method for recovering hydrogen cyanide in high yields from hot gas mixtures containing the same which comprises cooling the said hot gas mixture rapidly from a temperature of 600°–1250° C. to a temperature at which the hydrogen cyanide gases become dissolved by scrubbing the gas mixture initially at said high temperature with a relatively cool aqueous acidic solution of a polyhydroxy-boric acid complex.

7. A method for recovering hydrogen cyanide in high yields from hot gas mixtures containing the same which comprises cooling the said hot gas mixture rapidly from a temperature of 600°–1250° C. to a temperature below 400° C. by contacting the hot gas mixture with a relatively cool aqueous acidic solution of a polyhydroxy-boric acid complex, and recovering the cooled hydrogen cyanide gases leaving said solution by reacting the same before their decomposition and loss has occurred.

References Cited in the file of this patent

UNITED STATES PATENTS

| Number | Name | Date |
|---|---|---|
| 2,086,732 | Miller et al. | July 13, 1937 |
| 2,106,446 | Baehr et al. | Jan. 25, 1938 |
| 2,429,262 | Fallows et al. | Oct. 21, 1947 |
| 2,455,987 | Fallows et al. | Dec. 14, 1948 |
| 2,531,287 | Merrill et al. | Nov. 21, 1950 |
| 2,590,146 | Barsky | Mar. 25, 1952 |